UNITED STATES PATENT OFFICE.

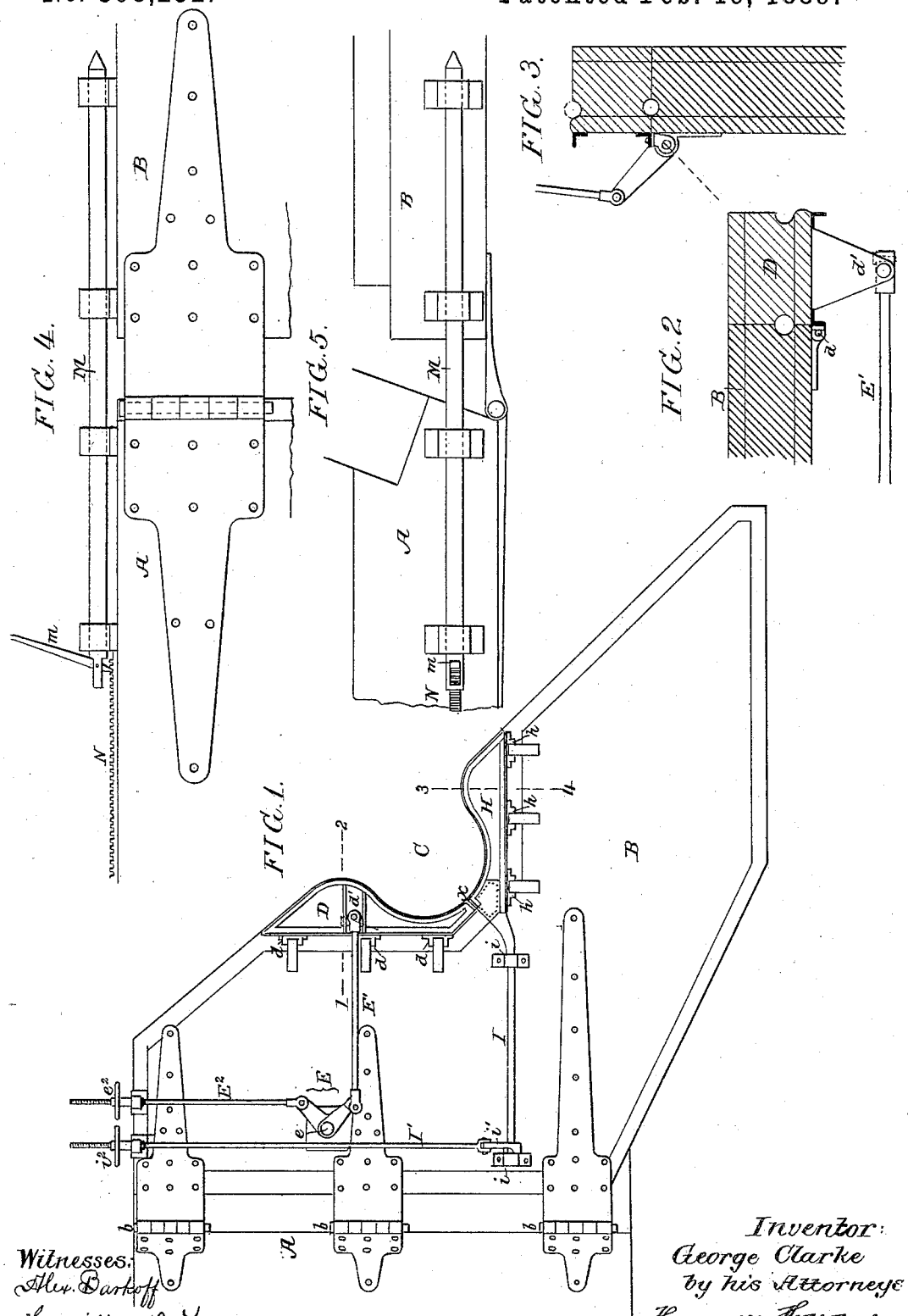
(No Model.)
G. CLARKE.
COFFER DAM FOR VESSELS.
No. 398,232. Patented Feb. 19, 1889.
Witnesses:
Alex Bartoff
Hamilton D. Turner
Inventor:
George Clarke
by his Attorneys
Howson & Howson

GEORGE CLARKE, OF JERSEY CITY, NEW JERSEY, ASSIGNOR TO HORACE G. PHILIPS, OF WILMINGTON, DELAWARE.

COFFER-DAM FOR VESSELS.

SPECIFICATION forming part of Letters Patent No. 398,232, dated February 19, 1889.

Application filed December 14, 1888. Serial No. 293,552. (No model.)

*To all whom it may concern:*

Be it known that I, GEORGE CLARKE, a citizen of the United States, and a resident of Jersey City, Hudson county, New Jersey, have invented certain Improvements in Coffer-Dams for Vessels, of which the following is a specification.

My invention relates to certain improvements in coffer-dams for vessels, for which Letters Patent were applied for by me on the 3d day of October, 1888, Serial No. 287,104.

My present invention relates particularly to the construction and operation of the supplemental gates on the main gates of the coffer-dam and the bolts for securing the main gates when opened.

In the accompanying drawings, Figure 1 is an end view of one-half of a coffer-dam, showing my improvements. Fig. 2 is a section on the line 1 2, Fig. 1. Fig. 3 is a section on the line 3 4, Fig. 1, and Figs. 4 and 5 are views illustrating the bolt for securing the main gates in an open position.

Referring to the drawings, A is the coffer-dam. B is one of the main gates hinged to said coffer-dam at $b$. The gates are cut out at C to allow for the screw-shaft projections on the hull of a twin-screw steamer. The shape of the gates corresponds with the shape of the hull of the vessel in cross-section. A tube or hose is inserted in the groove in the edge of the gate, and is preferably expanded in the same manner as described in the aforesaid application. I have found that it is preferable to hinge the auxiliary gates to the main gates rather than slide them in position, as in the above-mentioned application.

D is one of the auxiliary gates hung in a vertical position and allowed to swing out and against the face of the main gate. This gate is hung by hinges $d$ to the main gate, and the edge of this gate is curved to correspond with the contour or shape of the hull of the vessel at the point where the gate would come in contact with the hull when the coffer-dam is placed in position on the stern of the vessel. This gate is moved into and out of position by means of a two-armed lever, E, pivoted to the main gate $e$ and connected to a stud, $d'$, by a rod, E'. To the other arm of the lever E is attached a vertical rod, $E^2$, which passes through a handled nut, $e^2$, at the upper end of the gate. This rod is threaded at its upper end and adapted to said handled nut $e^2$, on turning which the gate can be moved into or out of position. The handled nut has its bearing in a block secured to the main gate.

H is the second auxiliary gate hung longitudinally to the main gates by hinges $h$. This gate makes a butt-joint with the gate D at the point $x$, so that the two gates fit completely the irregular shape of the hull of the vessel. To this gate is attached a bar or shaft, I, turning in bearings $i\ i$, secured to the main gate of the coffer-dam. On this shaft is an arm, $i'$, connected to a vertical shaft, I', which passes through a handled nut, $i^2$, which is also journaled in a bearing on the main gate in the same manner as the nut $e^2$. On turning the nut the shaft will be raised or lowered and the gate will consequently be opened or closed.

The hose, instead of extending around the edges of the auxiliary gates, passes around the opening, and short sections of hose may be attached to the auxiliary gates themselves to prevent leakage as much as possible between the hull of the vessel and the gates.

The bolt M, for securing the main gates in an open position, has at its rear a lever, $m$, pivoted thereto, which engages with a rack, N, on the coffer-dam, so that the bolt can be forced into position by the lever when necessary.

I claim as my invention—

1. The combination of the main gates of a coffer-dam, of auxiliary gates hinged thereto, and mechanism for moving said gates into and out of position, substantially as described.

2. The combination of the main gates of a coffer-dam, of the vertical hinged auxiliary gate, and a longitudinal hinged auxiliary gate, both extending to and meeting at the point $x$, so as to entirely close the irregular opening for the screw-shaft projections of the vessel, substantially as described.

3. The combination of the main gate, an auxiliary gate hinged thereto, the two-armed lever, one arm connected to said gate and the other arm connected to a vertically-movable screw-shaft, and a handled nut for said shaft, on turning which the gate will be opened or closed, substantially as described.

4. The combination, with the coffer-dam, of the hinged main gate, a bolt on one and adapted to pass into keepers in the other, a lever on said bolt, and a rack with which the lever engages, substantially as and for the purpose described.

In testimony whereof I have signed my name to this specification in the presence of two subscribing witnesses.

GEORGE CLARKE.

Witnesses:
   HENRY HOWSON,
   HARRY SMITH.